United States Patent [19]

Silverman

[11] Patent Number: 5,033,990

[45] Date of Patent: Jul. 23, 1991

[54] PULLEY HAVING SPRING LOADED RELEASE MECHANISM

[76] Inventor: Arthur Silverman, 2245 Harmain Rd., Pittsburgh, Pa. 15235

[21] Appl. No.: 556,635

[22] Filed: Jul. 23, 1990

[51] Int. Cl.$^5$ .............................................. F16H 55/32
[52] U.S. Cl. ........................................................ 474/46
[58] Field of Search ...................................... 474/25-27, 474/20, 46

[56] References Cited

U.S. PATENT DOCUMENTS

| | | | |
|---|---|---|---|
| 1,074,188 | 9/1913 | McGlynn | 474/46 X |
| 2,185,411 | 1/1940 | Lewellen et al. | 474/46 X |
| 2,255,211 | 9/1941 | Gebert . | |
| 2,376,925 | 5/1945 | Lavin . | |
| 2,425,736 | 8/1947 | Hall . | |
| 2,604,765 | 7/1952 | Smith . | |
| 2,706,546 | 4/1955 | Thomson . | |
| 2,797,587 | 7/1957 | Michie | 474/46 X |
| 2,842,005 | 7/1958 | Dunnihoo . | |
| 3,132,730 | 5/1964 | Dahlstrand et al. . | |
| 3,618,415 | 11/1971 | Ruprecht et al. | 474/46 X |
| 3,618,730 | 11/1971 | Mould . | |
| 3,709,051 | 1/1973 | Boissin | 474/46 |
| 3,834,183 | 9/1974 | Muller . | |
| 4,007,818 | 2/1977 | Orwin . | |
| 4,142,616 | 3/1979 | Dekoninck . | |
| 4,221,284 | 9/1980 | Hoff . | |
| 4,275,572 | 6/1981 | Holmes et al. . | |
| 4,548,316 | 10/1985 | Maurer . | |
| 4,632,376 | 12/1986 | DuBois . | |
| 4,645,472 | 2/1987 | Heidenreich . | |

FOREIGN PATENT DOCUMENTS

| | | | |
|---|---|---|---|
| 0623468 | 7/1961 | Canada | 474/46 |
| 1073786 | 1/1960 | Fed. Rep. of Germany | 474/46 |
| 0921462 | 5/1947 | France | 474/46 |
| 0069151 | 4/1982 | Japan | 474/46 |

Primary Examiner—Thuy M. Bui
Attorney, Agent, or Firm—Barry I. Friedman

[57] ABSTRACT

A pulley having a spring loaded release mechanism is disclosed which provides a safety override under high torque conditions. The pulley is provided with a first flange which rotates in the conventional manner with a central hub. A second flange is rotatably mounted on the central hub relative to the first flange and a bushing is disposed between the two flanges and may rotate relative to both. A resilient member urges the three elements together under normal operating conditions. The resilient member is preset to allow a certain amount of force on the second flange, relative to its speed. When this torque is surpassed by a belt mounted between the two flanges, the second flange and the bushing separate from the first flange to allow the belt to continue to spin on the bushing and a second flange, relative to the first flange. When the torque of the belt on the second flange returns to a level below that preset by the resilient member, the two flanges once again are urged together by the resilient member and the pulley resumes normal operation.

16 Claims, 1 Drawing Sheet

PULLEY HAVING SPRING LOADED RELEASE MECHANISM

BACKGROUND OF THE INVENTION

1. Field of the Invention

The present invention relates to a pulley which is utilized in conjunction with a V-shaped belt. More specifically, the invention relates to a pulley which releases its grip on the belt when a predetermined torque is exerted on the pulley.

2. Description of the Prior Art

Pulleys are frequently utilized to transfer rotational movement from one shaft to a second shaft. A pulley is mounted on each of the two shafts and a flexible belt is suspended therebetween. The rotation of the first shaft is transferred by the belt to the second shaft which is in turn rotated. The size ratios of the pulleys are generally determined by the need to increase or decrease the speed or torque of the driven shaft relative to the driving shaft. As the speed of the belt increases, the danger of a thrown belt or jammed shaft also increases. This danger is also increased because modern belts are frequently impregnated with metal strands to increase their strength.

The primary cause of a broken or thrown belt is a sudden counterforce acting upon the spinning shaft or pulley. For example, an electric motor having a spinning shaft is provided with a driving pulley. A belt extends to a second pulley mounted on a second shaft which drives a drill bit. As the drill bit begins cutting, a counterforce is exerted on the bit and back through the system by the friction of the bit on the cutting surface. So long as this force does not exceed the frictional forces holding the belt in registration with the pulleys, the system continues to operate normally. If, however, the drill bit encounters a material of greater hardness than previously encountered, or the like, the drill bit may be suddenly stopped or slowed. In this example, the drill bit, its attached shaft and the associated pulley, would suddenly stop or slow in a like manner as the torque in the shaft is increased. The electric driving motor and its associated shaft and pulley, however, would continue to run normally. This produces frictional forces on the belt connecting the two pulleys and generally tends to tear the belt.

Several devices have been proposed in the past to provide a release mechanism for one or both of the pulleys, such that when the counterforce from the driven shaft is encountered by the pulley, the belt is allowed to turn independently of the shaft which has encountered the restraining force. One type of such a device is exemplified by Smith, U.S. Pat. No. 2,604,765, issued July 29, 1952. Smith provides a pulley which may freewheel on a shaft. A clutch mechanism is attached to the shaft in the form of a circular frictional plate which is adapted to engage an interior mating surface on the pulley. The frictional plate is spring loaded. The frictional plate is in the shape of a broken circle, and is mounted inside the circular pulley. The C-shaped spring mechanism is also circular and tends to force the friction plate into a circle having a larger circumference. This provides a frictional contact between the friction plate and the pulley. When the rotational force on the pulley become greater than the frictional force on the spring urged friction plate, the pulley slips with respect to that plate.

A second type of torque override pulley is illustrated by Dahlstrand et al., U.S. Pat. No. 3,132,730, issued May 12, 1964. Dahlstrand et al. utilizes a slidable key to connect a driving element and a driven element. When the torque on the driven element rises above a preset limit, the key is forced away from a mating surface, releasing the pulley from the driving force. The key is held in place by a spring loaded lock which determines the amount of torque necessary to move the key away from the mating surface.

A third type of pulley is illustrated by Gebert, U.S. Pat. No. 2,255,211, issued Sept. 9, 1941. Gebert utilizes a pulley which spins freely on a shaft. The shaft has a cammed surface attached thereto which engages a spring loaded lever attached to the pulley. The cam and the lever move in registration with respect to each other so long as the force from the torque on the pulley does not overcome the force of the spring which biases the lever against the cam. When the preset torque is exceeded, the cam shifts the lever against the spring into a disengaged position.

Dunihoo, U.S. Pat. No. 2,842,005, issued July 8, 1958 discloses a clutch mechanism which utilizes ball bearings riding on a cam surface as the clutch device. In the operative mode, the driving shaft is engaged to the pulley hub through ball bearings. The ball bearings ride in a groove which has a cammed surface. When the torque becomes too great, the ball bearings are forced against the cam surfaces, which then moves the ball bearings away from the driving surface. This disengages the hub and the driving shaft.

The above described devices have several limitations. All have a wide variety of moving parts which must be carefully machined to specific tolerances to allow for continued operation. Additionally, this large number of component pieces increases the cost and time required for the assembly of the device. Furthermore, some of the devices require manual resetting once the safety feature has been activated. What is lacking in the art, therefore, is a simple, automatic resetting pulley which allows the belt to operate normally under normal torque conditions but to disengage without damage when a sudden high torque is encountered. The device should be of simple construction and easily manufactured and assembled.

SUMMARY OF THE INVENTION

A spring loaded torque release pulley is disclosed which provides either a set or variable safety device according to two embodiments. The device is generally comprised of a hollow cylindrical central hub which is adapted to be slidably inserted onto a driving or driven shaft. This central portion is preferably integrally combined with one of the two flange portions which comprise the sides of the pulley. A threaded bore is preferably provided for a fixed but removable mounting on the spinning shaft. A second flange is rotatably located on the central hub. This forms the second side of the pulley device. The two flange portions are separated by a bushing which is also rotatably mounted on the central hub. The two flanges and the bushing are urged together by a resilient means, preferably in the form of a spring, which is itself restrained by a locking washer. The locking washer is fixed to the central hub. The device is adapted to permit the sliding of the second flange member away from the first flange member against the resilient force of the spring. This occurs in the event that a V-belt mounted in the space between the two flange members is forced to rotate at a speed other than that of the central hub of the pulley. The belt may then ride on the rotatable bushing and rotatable flange surface. The amount of torque necessary to engage the release feature is determined by the characteristics of the spring and the configuration of the V-shaped space which is formed in the pulley.

A second embodiment is also disclosed in which the torque override feature may be manually adjusted by the user. In this embodiment, a threaded segment is provided on the central hub. A bolt is threadably mounted on this segment which may be utilized to change the spring characteristics of the resilient means, by increasing or decreasing the force upon the second flange.

These and other advantages and features of the present invention will be more fully understood with reference to the presently preferred embodiments thereof and to the appended drawings.

DESCRIPTION OF THE PREFERRED EMBODIMENTS

Figure 1:
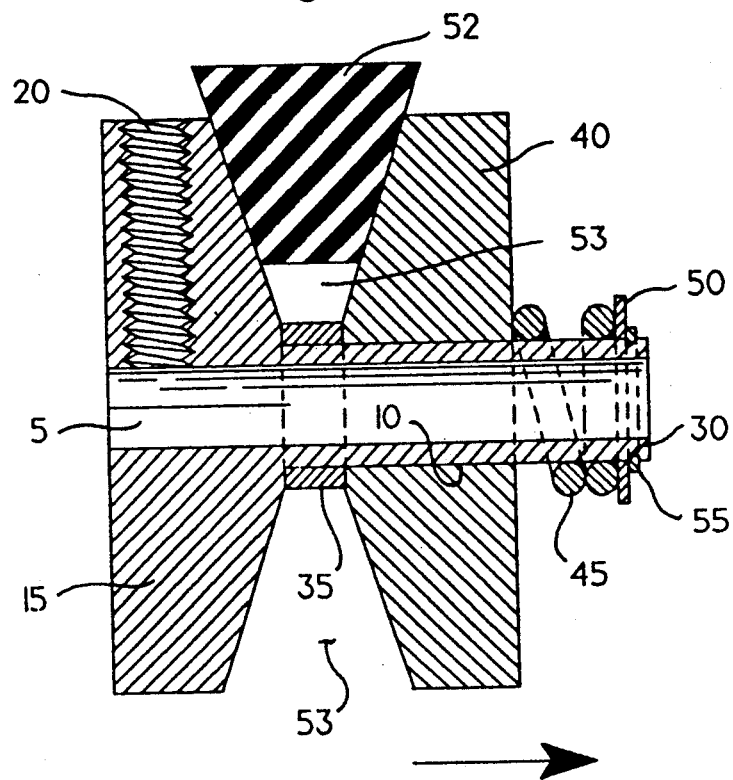
FIG. 1 is a sectional view of a Pulley Having Spring Loaded Release Mechanism.

The pulley is illustrated in FIG. 1 as having a central hub 1 with a bore 5 provided centrally therein. The bore preferably extends entirely through the central hub 1 of the device. The central hub 1 is generally circular in cross-section and is preferably constructed of metal. It is specifically noted, however, that any material of sufficient hardness and durability may be utilized in the construction of the device. The central hub 1 is provided with an exterior surface 10 which forms the circumference of the circular cross-sectional central hub. The exterior surface 10 is smooth to allow the other elements to be slidably and rotatably mounted thereon. The central hub 1 is provided with two ends. For reference, the leftmost end, as shown in FIG. 1, is further provided with a first flange 15 which is preferably integrally formed with the central hub 1. This integral construction is to provide added structural stability and strength. A threaded bore 20 is provided in the first flange to allow a mounting means 25 (see FIG. 2) such as a threaded bolt to be screwed down through the threaded bore engaging a shaft passing through bore 5. This will allow the pulley to spin in registration with a shaft 66 passing through bore 5 (see FIG. 2). The pulley may then be mounted on any shaft having the requisite thickness to be inserted within the bore 5 and is thus adaptable to a wide variety of machinery. At the rightmost end, as shown in FIG. 1, a retainer groove 30 is provided in the exterior surface 10 of central hub 1. The retainer groove 38 is spaced a small distance from the rightmost and of central hub 1, as shown in FIG. 1. The retainer groove 30 is equidistant from the end of the central hub 1 at all points such that it is perpendicular to the axis of rotation of the pulley.

A bushing 35 is slidably mounted on the exterior surface 10 of the central hub 1. The bushing 35 is preferably circular in cross-section having an interior diameter generally equal to that of the outer diameter of the central hub 1. In this way, the bushing 35 may spin freely on the exterior surface 10 of central hub 1 but without excessive eccentricity in its rotation. The bushing is adapted to abut first flange 15 and to spin freely even when in such engagement. The bushing is preferably constructed of metal but, like the other portions of the pulley, it may be constructed of any material of suitable hardness and durability. The bushing 35 may be of any thickness but must not exceed the outer diameter of first flange 15.

A space 53 is thus formed between first flange 15 and second flange 40. The space 53 contains bushing 35 which forms the bottom thereof. Belt 52 is intended to be mounted in the space 53. The belt 52, under normal operating conditions, is in contact with the inner surfaces of both first flange 15 and second flange 40.

Figure 2:
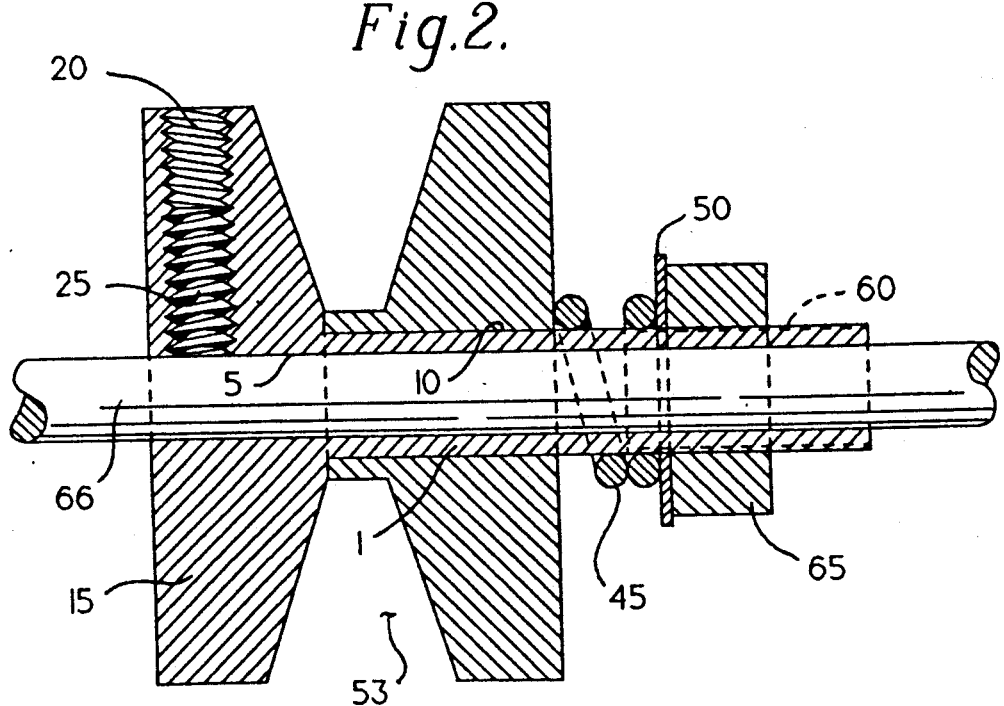
FIG. 2 is a sectional view of a second embodiment of a Pulley Having Spring Loaded Release Mechanism mounted on a shaft.

A second flange 40 is also provided, rotatably mounted on the exterior surface 10 of central hub 1. Like bushing 35, second flange 40 must be able to freely rotate on the exterior surface 10 without undue eccentricity during rotation. It must therefore have an inner diameter equal to that of the outer diameter of central hub 1. Furthermore, second flange 40 must rotate freely while in contact with bushing 35. An abutment surface similar to that between bushing 35 and first flange 15 is therefore provided, which is smooth and regular. It is contemplated, however, that bushing 35 may be integral with second flange 40, as shown in FIG. 2. Second flange 40 and first flange !5 are preferably of equal size, angular shape and are preferably mirror images of each other when mounted on central hub 1. Second flange 40 is preferably constructed of metal, but any material of suitable durability may be utilized.

A resilient means is provided in the form of spring 45 which urges second flange 40 and bushing 35 against first flange 15 along the exterior surface 10 of central hub 1. It is specifically intended that second flange 40, first flange 15 and bushing 35 be tightly squeezed to operate as a cohesive unit under normal torque conditions and that under such conditions no rotation of any of the three elements occurs relative to the other of these elements. Spring 45 is therefore selected according to its length and force to provide suitable friction between first flange 15, bushing 35 and second flange 40 to achieve this desired goal. The characteristics of the spring are determined by several factors, including the desired load encountered, the size of the pulley and the speed of the belt. Spring 45 is restrained by a restraining means in the form of washer 50. Washer 50, like bushing 35 and second flange 40, is sized to closely mount on the exterior surface 10 of central hub 1. Washer 50 is itself restrained by a locking means in the form of lock washer 55 which is mounted in groove 30.

The lock washer 55, which is mounted in groove 30, provides a permanent anchor against axial movement of any of the elements mounted on exterior surface 10 of central bore 1 beyond the rightmost end of central hub 1 as shown in FIG. 1. Washer 50 provides a flat registration surface against which spring 45 may act.

It is to be specifically understood that the pulley device may be embodied with the first flange 15 being rotatably mounted upon the central hub 1 in a like portion as second flange 40. In this case, central hub 1 would have to be affixed to a spinning shaft by some other holding means. One method would be to provide a locking means and spring on the central shaft to urge first flange 15 towards bushing 35 This spring and locking means would be provided on an extension of the central hub 1 leftwardly of first flange 15 as shown in FIG. 1. This would permit both first flange 15 and second flange 40 to resiliently separate from bushing 35. Another method would be to provide a first flange which is comprised of both a fixed portion and a rotatable portion.

A second embodiment of the device is shown in FIG. 2. Central hub 1 is extended to some degree and is provided with a threaded portion 60. Groove 30 has been eliminated from the exterior surface 10 of central hub 1 and the locking function of lock washer 55 has been substituted with an adjustable restraining means in the form of a nut 65, which is threadably mounted upon threaded portion 60. Nut 6 provides a fixed surface upon which washer 50 and in turn spring 45 may act. Nut 65, however, may be adjusted along the length of threaded portion 60 to increase or decrease the compression force of spring 45. The embodiment as shown in FIG. 1 has a preset torque limit which can be determined by the characteristics of the spring. A number of methods may be utilized in the second embodiment to restrain nut 65 on threaded portion 60 of central hub 1. A second nut or lock nut may be utilized and the use of a nylon threaded nut is also contemplated. This embodiment also illustrates a integral bushing 35 and second flange 40. It is to be noted that these parts are interchangeable with the separate elements shown in FIG. 1. In all other respects, the embodiments of FIG. 1 and FIG. 2 are similar.

In operation, the pulley is mounted upon a shaft 66, as shown in FIG. 2, which is passed through bore 5 and secured thereto by tightening holding means 25 down upon the inserted shaft. Whether the shaft is driving or driven, the pulley will operate in a like manner. Assuming that the first embodiment of the pulley is mounted on the driven shaft as described in the example provided in the previous Description of the Prior Art section, the action of the device is described as follows. When the restraining force is encountered by the drill bit and passed along to the shaft mounted in bore 5, central hub 1 and its integrally affixed first flange 15 will tend to decrease or stop in their rotational motion in accordance with a similar decrease or stop in the motion of the drill bit. The belt 52 running in the space 53 between first flange 15 and second flange 40 will, however, tend to continue its motion generally unabated as it is driven by an electric motor source. The moving belt 52 will then tend to drag against first flange 15 and second flange 40 and, in a conventional pulley, would likely separate because of the frictional force of the immobile pulley against the moving belt.

In the case of the device described herein, however, bushing 35 and second flange 40 may rotated independently of central hub 1 and first flange 15. This rotation is about exterior surface 10 of central hub 1. Second flange 40 is urged by the forces in the belt 52 against spring 45, compressing it against washer 50. Washer 50 is, of course, restrained from movement in a rightward direction, as shown in FIG. 1, by locking lock washer 55. Spring 45 is therefore compressed, allowing second flange 40 to move rightwardly along exterior surface 10 of central hub 1. Second flange 40 continues to rotate on exterior surface 10 of central hub 1 in registration with the moving belt 52. Bushing 35 provides a rotational surface for the lower surface of the belt and can move rightwardly in the direction of the arrow shown in FIG. 1 with second flange 40, which separates from first flange 15.

The belt 52 will continue to ride on bushing 35 and second flange 40 so long as central hub 1 and first flange 15 are immobilized or rotating at a speed other than that of the belt. While some friction between first flange 15 and the belt is unavoidable, the magnitude of the movement of bushing 35 and second flange 40 in the direction indicated by the arrow of FIG. 1 is such that this friction is greatly reduced. It is observed that the belt will move inwardly toward central hub 1 to a position closer to or in contact with bushing 35 than during normal operation. The movement of second flange 40 also serves to reduce the frictional forces of the belt against flange 15 due to the effective decrease of diameter of the pulley and the resultant loss of tension in the belt itself.

When the rotational motion of central hub 1 and first flange 15 is restored, the force of the belt 52 acting on second flange 40 is reduced in magnitude, allowing spring 45 to urge second flange 40 and bushing 45 leftwardly, as shown in FIG. 1. This causes the belt to move outwardly, away from bushing 35 and settle into its normal position in the space formed by first flange 15 and second flange 40. When full motion of central hub 1 and first flange 15 is restored, bushing 35 and second flange 40 are once again in contact with each other and with first flange 15 and normal operation is resumed automatically.

The operation of the second embodiment, shown in FIG. 2, is identical to that of the embodiment shown in FIG. 1. The only difference between the two embodiments is the ability to adjust torque at which the safety feature becomes operable in the second embodiment.

EXAMPLE

A resilient means in the form of a spring is provided, utilizing the first embodiment of the device. A spring having a gauge of 5/16 inches is selected, having a compressed length of 0.312 inches. This spring is intended to develop a compressive force of 25.32 pounds at a rate of 117.2 pounds per inch of compression. The spring is installed on a device having a central hub length of 1.86 inches and diameter of 0.75 inches. The flanges are 1.75 inches in diameter, and 1.12 inches in maximum thickness. The walls of the flanges are canted at 18 degrees. This device, as specified, will release the belt when a torque of approximately 15 foot-pounds is encountered.

While I have described a present preferred embodiment of the invention, it is to be distinctly understood that the invention is not limited thereto but may be otherwise embodied and practiced within the scope of the following claims.

I claim:

1. A pulley having an overload release mechanism, comprising:
   (i) a central hub having two ends and a bore therethrough;
   (ii) a first flange mounted upon said central hub and extending outwardly therefrom;
   (iii) a second flange rotatably mounted upon an exterior surface of said central hub and extending outwardly therefrom, the second flange adapted to abut said first flange and rotate independently therefrom;
   (iv) at least one resilient means mounted on said central hub abutting at least one of said flanges, at least one of said resilient means urging at least one of said flanges toward the other of said flanges; and
   (v) a bushing rotatably mounted upon the exterior surface of said central hub between said first and second flanges, said bushing adapted to rotate independently from said first flange.

2. A pulley as described in claim 1 further comprising mounting means for rotatably fixing said pulley upon a shaft inserted within said bore of said central hub.

3. A pulley as described in claim 1 wherein said bushing is integral with said second flange.

4. A pulley as described in claim 1 further comprising restraining means mounted at one end of said central hub.

5. A pulley as described in claim 4 wherein said first flange is mounted at the other end of said central hub.

6. A pulley as described in claim 4 wherein said resilient means engages said restraining means and said second flange, said resilient means urging said second flange away from said restraining means and toward said first flange.

7. A pulley as described in claim 4 wherein said restraining means further comprises a plurality of washers, at least one of which is a lock washer.

8. A pulley as described in claim 1 wherein said resilient means is a spring having preselected resilient characteristics.

9. A pulley as described in claim 1 wherein the first flange is integral with the central hub and is formed as a single element.

10. A pulley as described in claim 1 wherein the central hub further comprises a threaded portion at the other end thereof and the locking means comprises a threaded member.

11. A pulley as described in claim 10 wherein the threaded member is adjustable on the threaded portion.

12. A pulley as described in claim 11 wherein the characteristics of the resilient means are altered by the movement of the threaded member on the threaded portion.

13. A pulley as described in claim 1 wherein said bushing and said second flange are adapted to be slidably displaced against said resilient means.

14. A pulley as described in claim 13 wherein said bushing and said second flange are adapted to rotate relative to said first flange and said central hub while being urged against said resilient means.

15. A pulley as described in claim 14 wherein a belt is adapted for insertion between said first and second flanges and wherein said belt under certain conditions exerts a force against said second flange urging said second flange against said resilient means, said force adapted to displace said second flange along said central hub against said resilient means.

16. A pulley as described in claim 15 wherein said belt rotates in registration with said first and second flanges under normal operating conditions and rotates in registration with said second flange and relative to said first flange under certain operating conditions.

* * * * *

UNITED STATES PATENT AND TRADEMARK OFFICE
CERTIFICATE OF CORRECTION

PATENT NO. : 5,033,990

DATED : July 23, 1991

INVENTOR(S) : Arthur Silverman

It is certified that error appears in the above-identified patent and that said Letters Patent is hereby corrected as shown below:

Column 4, line 27, "flange !5" should read -- flange 5 --.

Column 5, line 12, "Nut 6" should be -- Nut 65 --.

Column 6, line 20, "flange !5" should read -- flange 15 --.

Signed and Sealed this

Sixteenth Day of February, 1993

*Attest:*

STEPHEN G. KUNIN

*Attesting Officer*   *Acting Commissioner of Patents and Trademarks*